US010800289B1

(12) United States Patent
Trim et al.

(10) Patent No.: US 10,800,289 B1
(45) Date of Patent: Oct. 13, 2020

(54) ADDRESSING RISK ASSOCIATED WITH A VEHICULAR SEAT COMPONENT

(71) Applicant: International Business Machines Corporation, Armonk, NY (US)

(72) Inventors: Craig M. Trim, Ventura, CA (US); Michael Bender, Rye Brook, NY (US); Jeremy R. Fox, Georgetown, TX (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/450,293

(22) Filed: Jun. 24, 2019

(51) Int. Cl.
```
B60N 2/00      (2006.01)
B60W 50/14     (2020.01)
B60R 21/015    (2006.01)
B60W 40/08     (2012.01)
```
(52) U.S. Cl.
CPC ........ B60N 2/002 (2013.01); B60R 21/01554 (2014.10); B60R 21/01556 (2014.10); B60W 50/14 (2013.01); B60W 2040/0881 (2013.01); B60W 2050/143 (2013.01); B60W 2050/146 (2013.01)

(58) Field of Classification Search
CPC ......... B60W 50/14; B60W 2040/0881; B60W 2050/143; B60W 2050/146; B60N 2/002; B60R 21/01554; B60R 21/01556
USPC ......................................................... 340/540
See application file for complete search history.

(56) References Cited

U.S. PATENT DOCUMENTS

| | | | |
|---|---|---|---|
| 5,668,526 A | 9/1997 | Collins | |
| 5,804,887 A * | 9/1998 | Holzapfel | B60N 2/002 180/282 |
| 6,922,147 B1 | 7/2005 | Viksnins et al. | |
| 7,004,541 B2 | 2/2006 | Sedlack | |
| 8,058,983 B1 * | 11/2011 | Davisson | G08B 21/0205 340/10.1 |

(Continued)

OTHER PUBLICATIONS

Tsai, Michelle. Innovative car seat alerts parents to potential dangers of True Fit I Alert. Consumer Reports, Sep. 19, 2013. [3 printed pages.] <https://www.consumerreports.org/cro/news/2013/09/the-first-years-true-fit-ialert-car-seat/index.htm>.

(Continued)

*Primary Examiner* — Ojiako K Nwugo
(74) *Attorney, Agent, or Firm* — The Steadman Law Firm PLLC

(57) ABSTRACT

Techniques are described with respect to addressing vehicular seat component risk. An associated method includes identifying any risk factor associated with a physical configuration of a vehicular seat component within a vehicle, identifying any risk factor associated with health of an occupant of the vehicular seat component, and identifying any risk factor associated with compatibility of the occupant of the vehicular seat component. The method further includes transmitting to at least one entity associated with the vehicle at least one alert addressing one or more of the identified risk factors. In an embodiment, transmitting the at least one alert includes creating the at least one alert including a calculated sum of risk level values assigned to each identified risk factor and information related to one or more identified risk factors based upon risk level value in the context of at least one predefined risk threshold value.

20 Claims, 6 Drawing Sheets

(56) References Cited

U.S. PATENT DOCUMENTS

| | | | | |
|---|---|---|---|---|
| 8,217,796 B2* | 7/2012 | Trummer | B60N 2/2812 | 340/438 |
| 2002/0158497 A1* | 10/2002 | Nivet | B60N 2/0244 | 297/330 |
| 2007/0032914 A1* | 2/2007 | Kondoh | B60W 50/16 | 701/1 |
| 2008/0228358 A1* | 9/2008 | Wang | B60R 21/01554 | 701/49 |
| 2009/0027188 A1* | 1/2009 | Saban | B60N 2/002 | 340/521 |
| 2009/0292222 A1* | 11/2009 | Ferren | A61B 5/0031 | 600/549 |
| 2010/0045454 A1* | 2/2010 | Knight | G08B 21/0453 | 340/521 |
| 2010/0078978 A1* | 4/2010 | Owens | B60N 2/002 | 297/250.1 |
| 2010/0222960 A1* | 9/2010 | Oida | B62D 15/029 | 701/31.4 |
| 2011/0115267 A1* | 5/2011 | Biaud | B60N 2/2806 | 297/250.1 |
| 2013/0009761 A1* | 1/2013 | Horseman | A61B 5/6893 | 340/425.5 |
| 2013/0194089 A1 | 8/2013 | Estrada | | |
| 2013/0201013 A1 | 8/2013 | Schoenberg | | |
| 2014/0015971 A1 | 1/2014 | DeJuliis | | |
| 2014/0253314 A1* | 9/2014 | Rambadt | B60N 2/002 | 340/457.1 |
| 2015/0196209 A1* | 7/2015 | Morris | G16H 40/67 | 600/480 |
| 2016/0035222 A1* | 2/2016 | Mikuni | G08G 1/0962 | 701/117 |
| 2016/0046261 A1* | 2/2016 | Gulash | B60R 22/48 | 701/23 |
| 2016/0121848 A1* | 5/2016 | Seibert | B60W 50/14 | 340/457 |
| 2016/0200250 A1 | 7/2016 | Westmoreland | | |
| 2016/0362046 A1* | 12/2016 | Gordon | B60Q 9/00 | |
| 2017/0232887 A1* | 8/2017 | Clontz | B60Q 5/005 | 340/457 |
| 2018/0082563 A1 | 3/2018 | Cristella et al. | | |
| 2019/0009695 A1* | 1/2019 | Schonfeld | B60N 2/002 | |
| 2019/0344738 A1* | 11/2019 | Ga | B60R 21/01536 | |

OTHER PUBLICATIONS

Batra, Erich K. et al. Hazards Associated with Sitting and Carrying Devices for Children Two Years and Younger. The Journal of Pediatrics, Jul. 2015, vol. 167, Issue 1, pp. 183-187.

* cited by examiner

ADDRESSING RISK ASSOCIATED WITH A VEHICULAR SEAT COMPONENT

BACKGROUND

The various embodiments described herein generally relate to addressing risk associated with a vehicular seat component. More specifically, the various embodiments describe techniques of transmitting at least one alert with respect to one or more identified risk factors associated with a vehicular seat component.

A vehicular seat component accommodates a vehicle occupant, such as an infant, who may need support beyond what is provided by a basic vehicle seat or platform. While a vehicular seat component may provide posture, comfort, and/or safety enhancements to a vehicle occupant, various issues may arise.

SUMMARY

The various embodiments described herein provide techniques of addressing vehicular seat component risk. An associated computer-implemented method includes identifying any risk factor associated with a physical configuration of a vehicular seat component within a vehicle, identifying any risk factor associated with health of an occupant of the vehicular seat component, and identifying any risk factor associated with compatibility of the occupant of the vehicular seat component. The computer-implemented method further includes transmitting to at least one entity associated with the vehicle at least one alert addressing at least one identified risk factor.

In an embodiment, the step of identifying any risk factor associated with the physical configuration of the vehicular seat component includes identifying a vehicular seat configuration risk factor by determining that the vehicular seat component is improperly configured within the vehicle. Additionally or alternatively, the step of identifying any risk factor associated with the physical configuration of the vehicular seat component includes identifying an occupant positioning risk factor by determining that the occupant of the vehicular seat component is improperly positioned within the vehicular seat component per specifications of the vehicular seat component.

In a further embodiment, the step of identifying any risk factor associated with the health of the occupant of the vehicular seat component includes identifying an occupant medical risk factor by identifying a medical issue associated with the occupant of the vehicular seat component. Additionally or alternatively, the step of identifying any risk factor associated with the health of the occupant of the vehicular seat component includes identifying an environmental risk factor by identifying an environmental hazard associated with the occupant of the vehicular seat component.

In a further embodiment, the step of identifying any risk factor associated with the compatibility of the occupant of the vehicular seat component includes comparing physical characteristics of the occupant of the vehicular seat component to predetermined occupancy ranges established for the vehicular seat component. The step of identifying any risk factor associated with the compatibility of the occupant further includes, consequent to the comparison, identifying an occupant size compatibility risk factor by determining that the physical characteristics of the occupant of the vehicular seat component are incompatible with the predetermined occupancy ranges. Optionally, the step of identifying any risk factor associated with the compatibility of the occupant further includes, consequent to the comparison, identifying a projected size compatibility risk factor based upon a projected change in the physical characteristics of the occupant of the vehicular seat component.

In a further embodiment, the step of transmitting to the at least one entity associated with the vehicle the at least one alert addressing at least one identified risk factor includes generating a list of risk factors including each of the at least one identified risk factor, assigning a weighted risk value to each of the at least one identified risk factor, and calculating a sum of the assigned weighted risk values. The transmitting step further includes creating the at least one alert including (i) the sum of the assigned weighted risk values or (ii) information related to one or more of the at least one identified risk factor based upon weighted risk value in the context of at least one predefined risk threshold value.

One or more additional embodiments pertain to a computer program product including a computer readable storage medium having program instructions embodied therewith. According to such embodiment(s), the program instructions may be executable by a computing device to cause the computing device to perform one or more steps of above recited computer-implemented method. One or more further embodiments pertain to a system having a processor and a memory storing an application program, which, when executed on the processor, performs one or more steps of the above recited computer-implemented method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
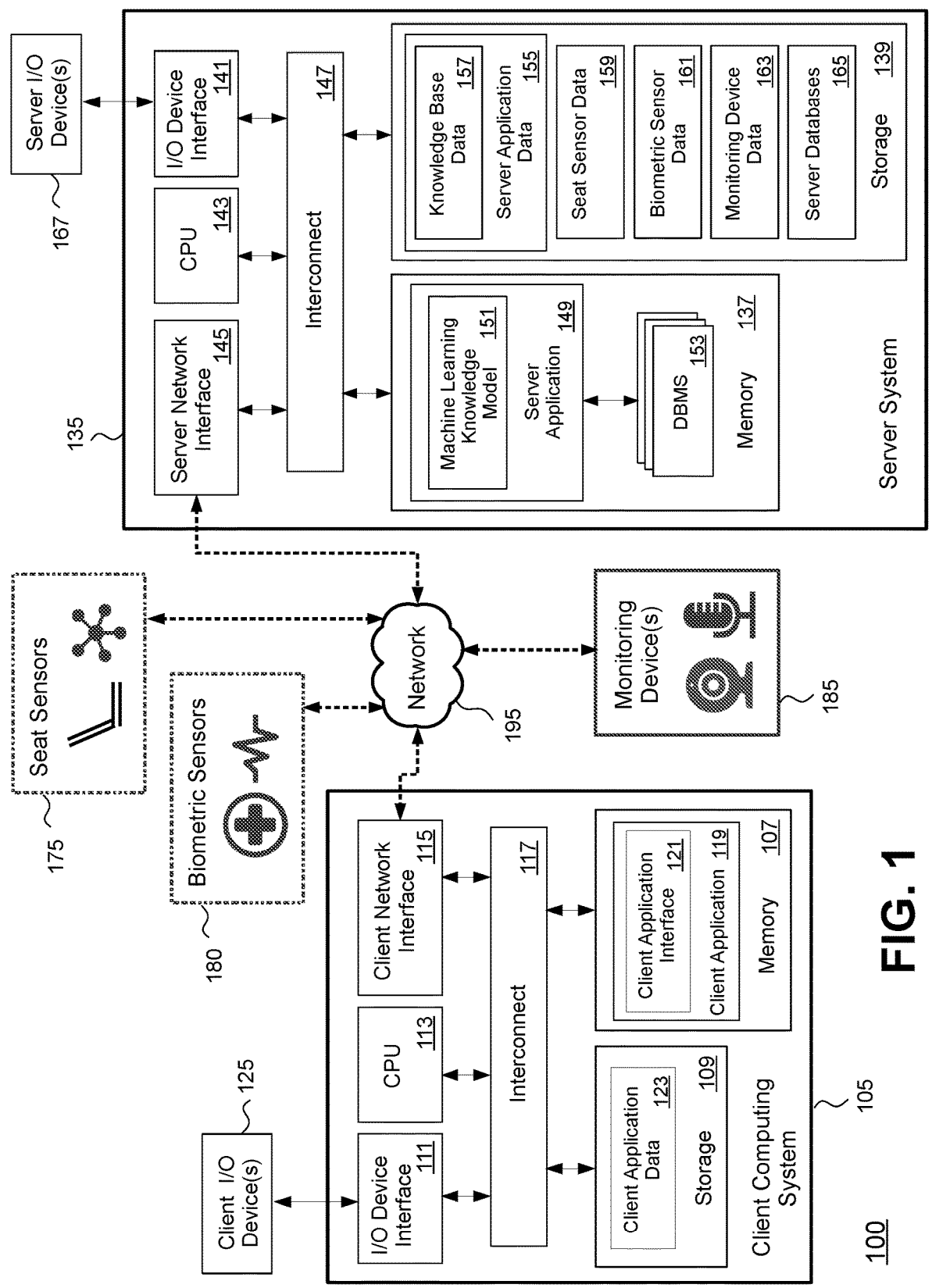
FIG. 1 illustrates a computing infrastructure, according to one or more embodiments.

The various embodiments described herein are directed to techniques of addressing vehicular seat component risk. A server system configured to implement techniques associated with the various embodiments described herein identifies at least one risk factor related to a vehicular seat component and/or an occupant thereof and transmits at least one alert associated with the at least one identified risk factor to at least one interested entity.

The various embodiments described herein may have advantages over conventional techniques. Specifically, the various embodiments may automate risk management by identifying one or more risk factors associated with a vehicular seat component and/or an occupant thereof via a plurality of seat sensors, a plurality of biometric sensors, and/or one or more monitoring devices. Such risk management automation may enable a driver and/or other entities associated with a vehicle to focus upon driving or other transportation related tasks. The various embodiments may improve computer technology by facilitating machine learning to determine whether a vehicular seat component is properly configured within a vehicle, to determine whether an occupant of such vehicular seat component is properly positioned, to identify any medical issue associated with such occupant, and/or to identify any environmental hazard associated with such occupant. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s) Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Particular embodiments describe techniques relating to addressing vehicular seat component risk. However, it is to be understood that the techniques described herein may be adapted to a variety of purposes in addition to those specifically described herein. Accordingly, references to specific embodiments are included to be illustrative and not limiting.

FIG. 1 illustrates a computing infrastructure 100, according to an embodiment. As shown, computing infrastructure 100 includes a client computing system 105, a server system 135, a plurality of seat sensors 175, and a plurality of biometric sensors 180, and monitoring device(s) 185, each connected to a communications network 195.

Illustratively, client computing system 105 includes, or is otherwise operatively coupled to, a memory 107, storage 109, an input/output (I/O) device interface 111, a central processing unit (CPU) 113, and a client network interface 115, all of which are interconnected via interconnect 117 (e.g., a bus). One or more aspects of client computing system 105 are accessed or controlled by one or more clients. Although shown as a single computing system, client computing system 105 is included to be representative of a single client or multiple clients. The one or more clients associated with the client computing system 105 (or multiple respective client computing systems 105) may include at least one entity associated with a vehicle, such as a driver, passenger (s), and/or any other party associated with the vehicle or associated with the occupant of a vehicular seat component. For instance, in the event that a vehicle is partially or fully autonomous, a client may be a party having partial or full remote/supervisory control of such vehicle. In another instance, a client may be a relative of the occupant but not a driver or passenger of such vehicle. In an embodiment, client computing system 105 is a thin client. Memory 107 includes a client application 119. In an embodiment, client application 119 is an online application configured for interfacing with server system 135 and other computing systems. Client application 119 includes a client application interface 121. In the event of multiple clients, multiple instances of client computing system 105 may be present, each having a respective client application 119 including at least one respective client application interface 121. Client application interface 121 includes a graphical user interface (GUI), a command line interface, and/or a sensory interface (e.g., capable of discerning client sound/voice commands). Storage 109 includes client application data 123 associated with client application 119. One or more components of a GUI, a command line interface, and/or a sensory interface included in client application interface 121 may facilitate client input and/or may facilitate display of client application data 123. I/O device interface 111 is communicatively coupled to client I/O device(s) 125 (e.g., touchscreen console, trackpad, joystick, microphone, speaker, etc.). The client(s) may interact with client application interface(s) 121 via the client I/O device(s) 125. CPU 113 is included to be representative of a single CPU, multiple CPUs, a single CPU having multiple processing cores, and the like. Client network interface 115 is configured to receive data from and transmit data to server system 135 via network 195.

Although shown as a single computing system, server system 135 is included to be representative of a single server system or multiple server systems. In an embodiment, server system 135 includes a single hardware server configured to provide hosting capabilities. In an alternative embodiment, server system 135 includes, or is otherwise operatively coupled to, a plurality of hardware and/or virtualized servers configured to provide hosting capabilities. In a further alternative embodiment, server system 135 is a cloud server system configured to provide distributed hosting capabilities via a plurality of cloud computing nodes in a cloud computing environment. According to such further alternative embodiment, the cloud computing nodes are configured to communicate with one another. Additionally, according to such further alternative embodiment, the cloud computing environment optionally offers infrastructure, platforms, and/ or software as a service for which client computing system 105 or other systems associated with computing infrastructure 100 need not maintain resources locally.

Illustratively, server system 135 includes, or is otherwise operatively coupled to, memory 137, storage 139, an I/O device interface 141, a CPU 143, and a server network interface 145, all of which may be interconnected via interconnect 147 (e.g., a bus). Memory 137 includes a server application 149. Server application 149 includes or is otherwise operatively coupled to a machine learning knowledge model representation 151. In an embodiment, server application 149 is configured to execute one or more artificial intelligence algorithms utilizing one or more machine learning techniques via machine learning knowledge model representation 151. According to such embodiment, machine learning knowledge model representation 151 includes or is otherwise operatively coupled to a machine learning knowledge model and at least one knowledge base associated therewith. According to such embodiment, some or all aspects of the machine learning knowledge model may run within server system 135. Additionally or alternatively, some or all aspects of machine learning knowledge model may run externally to server system 135, e.g., via a cloud-based implementation, in which case server system 135 communicates with the machine learning knowledge model via machine learning knowledge model representation 151. Some or all aspects of the at least one knowledge base optionally are incorporated into server system 135. Alternatively, some or all aspects of the at least one knowledge base are externally located and communicatively coupled to server system 135. Memory 137 further includes or is otherwise operatively coupled to database management system (DBMS) 153. DBMS 153 is included to be representative of a single database system or multiple database systems. Server application 149 is configured to address vehicular seat component risk according to the various embodiments described herein. In an embodiment, server application 149 facilitates authentication of client computing system 105 and/or other client systems in computing infrastructure 100. In an alternative embodiment, server application 149 sends authentication information associated with client computing system 105 and/or other client systems to an external directory server system, which may in turn perform any necessary authentication steps.

Storage 139 includes server application data 155. Server application 149 generates and processes server application data 155 based on interaction with other components of computing infrastructure 100. Server application data 155 includes knowledge base data 157 generated and/or used by the machine learning knowledge model. Knowledge base data 157 includes vehicle datapoints pertaining to characteristics of one or more portions of a vehicle, seat component datapoints pertaining to a vehicular seat component in such vehicle, medical datapoints pertaining to an occupant of such vehicular seat component, and/or environmental datapoints pertaining to aspects or objects within such vehicle. In an embodiment, knowledge base data 157 includes data associated with the at least one knowledge base. Storage 139 further includes seat sensor data 159 associated with (e.g., received from) the plurality of seat sensors 175. Storage 139 further includes biometric sensor data 161 associated with (e.g., received from) the plurality of biometric sensors 180. Storage 139 further includes monitoring device data 163 associated with (e.g., received from) the monitoring device(s) 185. Storage 139 further includes server databases 165. DBMS 153 includes or interfaces with a software application configured to manage server databases 165. In an embodiment, server application 149 sends database requests to DBMS 153 and processes results returned by DBMS 153. In a further embodiment, server databases 165 include one or more relational databases. In an additional embodiment, server databases 165 include one or more ontology trees or other ontological structures. Server system 135 (and more generally computing infrastructure 100) may include any number of databases. According to a further embodiment, DBMS 153 sends requests to remote databases (not shown) via network 195.

I/O device interface 141 is communicatively coupled to server I/O device(s) 167. CPU 143 is included to be representative of a single CPU, multiple CPUs, a single CPU having multiple processing cores, and the like. Server network interface 145 is configured to receive data from and transmit data to client computing system 105 or other client system(s) via network 195. Specifically, server application 149 is configured to accept requests sent by client computing system 105 or other client system(s) to server system 135 and is configured to transmit data to client computing system 105 or other client system(s) via server network interface 145. Furthermore, server network interface 145 is configured to receive data from and/or transmit data to the plurality of seat sensors 175 and/or the plurality of biometric sensors 180 via network 195.

The plurality of seat sensors 175 are Internet of Things (IoT) sensors capable of communicating with other systems or devices in computing infrastructure 100, including client computing system 105, server system 135, the plurality of biometric sensors 180, and/or monitoring device(s) 185. In an embodiment, the plurality of seat sensors 175 include analog sensors and/or digital sensors. One or more sensors among the plurality of seat sensors 175 optionally include both analog and digital characteristics. In a further embodiment, one or more of the plurality of seat sensors 175 are located on or otherwise are attached to a vehicular seat component. Additionally or alternatively, one or more of the plurality of seat sensors 175 otherwise are operatively coupled with or associated with a vehicular seat component. In a further embodiment, one or more of the plurality of seat sensors 175 are embedded in the vehicular seat component at one or more pressure points of contact between a vehicular seat component and an occupant thereof. The plurality of seat sensors 175 record occupant position (and optionally changes in occupant position) with respect to the vehicular seat component based upon occupant body position relative to the one or more pressure points of contact. One or more of the plurality of seat sensors 175 optionally determine one or more physical characteristics of an occupant of a vehicular seat component, including height/length and/or weight.

The plurality of biometric sensors 180 are IoT sensors capable of communicating with other systems or devices in computing infrastructure 100, including client computing system 105, server system 135, the plurality of seat sensors 175, and/or monitoring device(s) 185. In an embodiment, the plurality of biometric sensors 180 include analog sensors and/or digital sensors. One or more sensors among the plurality of biometric sensors 180 optionally include both analog and digital characteristics. In a further embodiment, one or more of the plurality of biometric sensors 180 are located on or otherwise are attached to an occupant of a vehicular seat component, subject to the consent of such occupant or a legal guardian/representative of such occupant. Additionally or alternatively, one or more of the plurality of biometric sensors 180 otherwise are operatively coupled with or associated with an occupant of a vehicular seat component.

Monitoring device(s) 185 optionally include one or more video capture and/or video monitoring devices configured to record or otherwise process video data with respect to a vehicular seat component and/or an occupant thereof. In an embodiment, monitoring device(s) 185 optionally include one or more video recorders. Additionally or alternatively, monitoring device(s) 185 optionally include one or more audio capture devices, one or more audio recorders, and/or one or more audio monitoring devices configured to record or otherwise process audio data with respect to a vehicular seat component and/or an occupant thereof. Additionally or alternatively, monitoring device(s) 185 optionally include one or more audiovisual capture and/or audiovisual monitoring devices configured to record or otherwise process audiovisual data with respect to a vehicular seat component and/or an occupant thereof. Additionally or alternatively, monitoring device(s) 185 optionally include one or more photographic capture devices or other image capture devices configured to capture one or more images with respect to a vehicular seat component and/or an occupant thereof.

In the context of the various embodiments described herein, a vehicular seat component is a three-dimensional physical component (e.g., an apparatus, a product, and/or an article of manufacture) attached to or otherwise associated with a vehicle to provide posture, comfort, and/or safety support for an occupant. Specifically, a vehicular seat component may be embedded within the build of a vehicle or may be a separate component installed within the vehicle. In an embodiment, one or more portions of the seat component include a substrate of plastic, paper, foam, gel, and/or other material. According to certain embodiments, a vehicular seat component may be referred to as a car seat, a child safety seat, and/or a smart seat. In the context of the various embodiments described herein, a vehicle includes any apparatus or system configured for transport or other movement (e.g., car, truck, sport utility vehicle, plane, train, bicycle, motorcycle, moped, boat, ship, yacht, floating docket, raft, ski lift, recreational watercraft, funicular, etc.). In an embodiment, an occupant of a vehicular seat component is a child, in which case the vehicular seat component is a child safety seat. In an alternative embodiment, an occupant of a vehicular seat component is an elderly or infirm individual, e.g., in need of posture, comfort, and/or safety support beyond that which is provided by a basic or standard vehicle seat.

Figure 2:
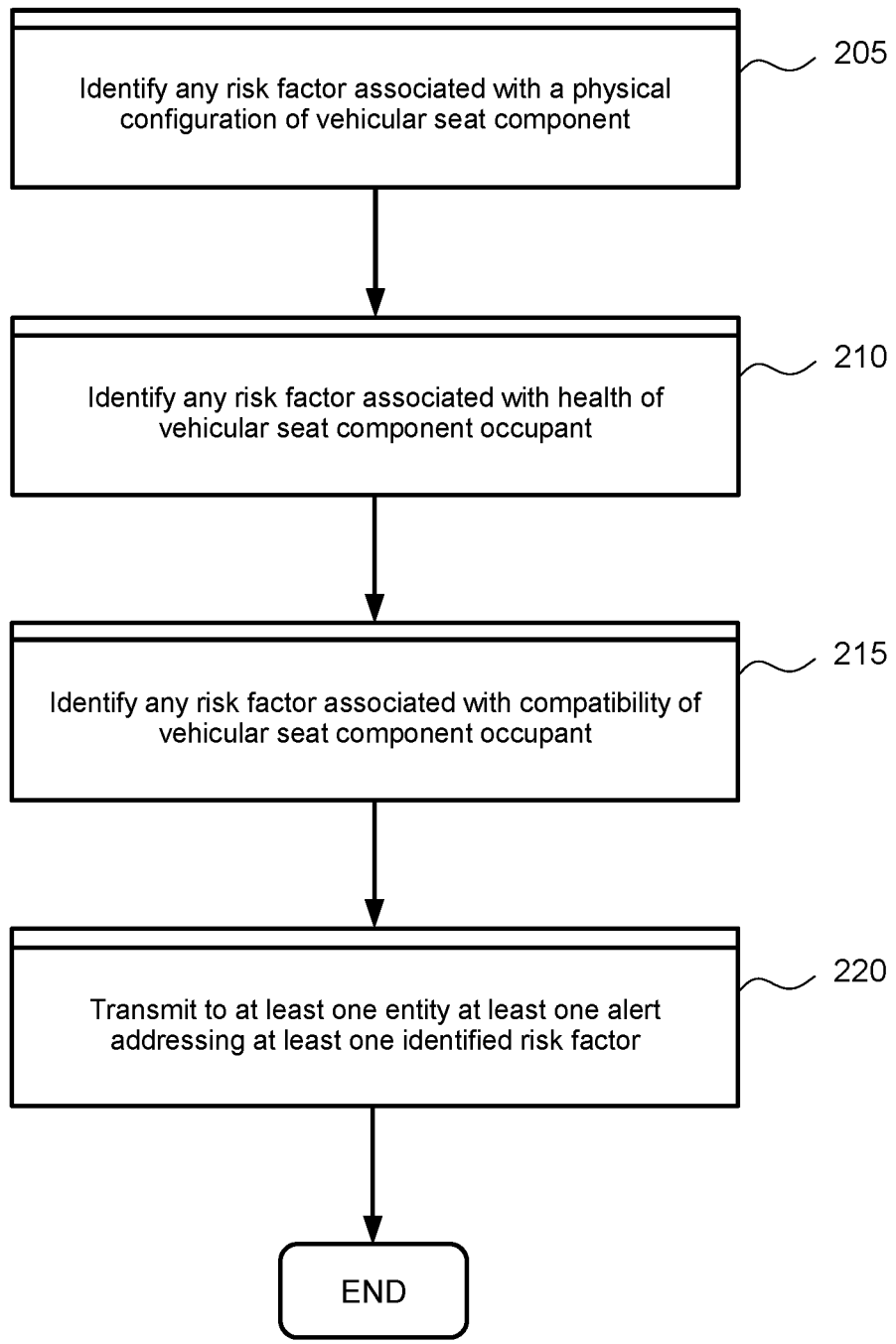
FIG. 2 illustrates a method of addressing vehicular seat component risk factors, according to one or more embodiments.

FIG. 2 illustrates a method 200 of addressing one or more vehicular seat component risk factors. One or more steps associated with the method 200 and the other methods described herein may be carried out in a client-server computing environment (e.g., computing infrastructure 100) including a network (e.g., network 195). A server application in a server system of the client-server computing environment (e.g., server application 149 in server system 135 of computing infrastructure 100) facilitates processing according to the method 200 and the other methods further described herein. The server application interacts with each of one or more clients via a respective client interface associated with a client application of a client computing system (e.g., client application interface 121 associated with client application 119 of client computing system 105). A respective client interface optionally includes a vehicle console. Such vehicle console optionally includes a GUI, at least one vehicle input device (e.g., a microphone or control panel), and/or at least one vehicle output device (e.g., one or more vehicle speakers). Additionally or alternatively, a respective client interface optionally includes a client device (e.g., mobile device, laptop, etc.). Additionally or alternatively to the client-server computing environment, one or more steps associated with the method 200 and the other methods described herein may be carried out within one or more workloads of a cloud computing environment. Additionally or alternatively, one or more steps associated with the method 200 and the other methods described herein may be carried out in a peer-to-peer network environment, in which case one or more of the method steps described herein may be carried out via a peer application of a peer computing system.

In an embodiment, in the context of the method 200 and the other methods described herein, the server application addresses at least one risk factor identified within a predefined time period. Optionally the server application designates the predefined time period, or alternatively an entity among at least one entity associated with a vehicle designates the predefined time period via a respective client interface. In the context of the method 200 and the other methods described herein, at least one entity associated with a vehicle optionally includes a driver of the vehicle, one or more passengers of the vehicle, one or more owners of the vehicle, one or more manufacturers associated with the vehicle, one or more manufacturers associated with a vehicular seat component within the vehicle, and/or one or more individuals/groups otherwise associated with an occupant of the vehicular seat component (e.g., relatives, friends, and/or peers). Furthermore, in the context of the method 200 and the other methods described herein, the server application provides an occupant of a vehicular seat component (or one or more legal guardians/representatives of the occupant) as well as each of the at least one entity associated with the vehicle advance notice of any personal data collection, including data collection via sensors and/or monitoring devices. The server application further provides an option to opt in or opt out of any such personal data collection at any time. Optionally, the server application further transmits at least one notification to any affected entity each time any such personal data collection occurs.

The method 200 begins at step 205, where the server application identifies any risk factor associated with a physical configuration of a vehicular seat component within a vehicle. Identifying any risk factor associated with the physical configuration of the vehicular seat component entails, inter alia, determining whether the vehicular seat component is properly installed/configured within the vehicle and/or determining whether an occupant of the vehicular seat component is properly positioned therein. According to step 205, the server application identifies any risk associated with the physical configuration of the vehicular seat component based upon data from a plurality of seat IoT sensors associated with the vehicular seat component (e.g., the plurality of seat sensors 175). The server application optionally obtains seat sensor information from IoT feeds generated via the plurality of seat sensors. Additionally or alternatively, the server application identifies any such risk based upon video data, audio data, audiovisual data, and/or image data captured by one or more monitoring devices configured to record or otherwise capture data with respect to the vehicular seat component and/or the occupant of the vehicular seat component (e.g., monitoring device(s) 185). In one scenario, the server application identifies one or more risk factors associated with the physical configuration of the vehicular seat component within the predefined time period. In an alternative scenario, the server application identifies no risk factor associated with the physical configuration of the vehicular seat component within the predefined time period. A method with regard to identifying any risk factor associated with the physical configuration of the vehicular seat component in accordance with step 205 is described with respect to FIG. 3.

At step 210, the server application identifies any risk factor associated with health of the occupant of the vehicular seat component. Identifying any risk factor associated with the health of the occupant entails, inter alia, identifying any medical issue associated with the occupant and/or identifying any environmental hazard associated with the occupant. According to step 210, the server application identifies any risk associated with the health of the occupant based upon data from a plurality of biometric IoT sensors attached to or otherwise associated with the occupant (e.g., the plurality of biometric sensors 180). The server application optionally obtains biometric sensor information from IoT feeds generated via the plurality of biometric sensors. Additionally or alternatively, the server application identifies any such risk based upon video data, audio data, audiovisual data, and/or image data captured by the one or more monitoring devices. In one scenario, the server application identifies one or more risk factors associated with the health of the occupant within the predefined time period. In an alternative scenario, the server application identifies no risk factor associated with the health of the occupant within the predefined time period. A method with regard to identifying any risk factor associated with the health of the occupant of the vehicular seat component in accordance with step 210 is described with respect to FIG. 4.

At step 215, the server application identifies any risk factor associated with compatibility of the occupant of the vehicular seat component. By comparing physical characteristics of the occupant to predetermined occupancy ranges established for the vehicular seat component, the server application determines whether the vehicular seat component is currently appropriate for the occupant and/or predicts when another vehicular seat component may be needed. According to step 215, the server application identifies any risk associated with the compatibility of the occupant based upon data from the plurality of seat sensors. Additionally or alternatively, the server application identifies any such risk based upon video data, audio data, audiovisual data, and/or image data captured by the one or more monitoring devices. In an embodiment, the server application identifies any risk factor associated with occupant compatibility by identifying any risk factor associated with fit, posture, and/or mobility of the occupant within the vehicular seat component. In one scenario, the server application identifies one or more risk factors associated with the compatibility of the occupant within the predefined time period. In an alternative scenario, the server application identifies no risk factor associated with the compatibility of the occupant within the predefined time period. A method with regard to identifying any risk factor associated with the compatibility of the occupant of the vehicular seat component in accordance with step 215 is described with respect to FIG. 5.

At step 220, the server application transmits to at least one entity associated with the vehicle at least one alert addressing at least one identified risk factor, i.e., among any risk factor(s) identified at steps 205, 210, and/or 215. In an embodiment, in the context of step 220, the at least one alert addresses any risk factor identified within the predefined time period. Alternatively, the at least one alert addresses a subset of risk factors identified with the predefined time period. The server application transmits the at least one alert to at least one client interface associated with one or more of the at least one entity. In an embodiment, the server application transmits the at least one alert by relaying the at least one alert through a console associated with the vehicle, e.g., via a message displayed in a console screen and/or via an audio message/tone emitted from at least one output device of the console (e.g., one or more vehicle speakers). Additionally or alternatively, the server application transmits the at least one alert by relaying the at least one alert through at least one client device associated with one or more of the at least one entity, e.g., via a GUI-based notification (e.g., a textual and/or graphical message) and/or an audio message/tone. In a further embodiment, the server application provides the at least one entity an option to register to receive alerts. According to such further embodiment, upon registration by an entity among the at least one entity, the server application transmits the at least one alert to the entity according to one or more alert techniques chosen upon registration. A method with regard to transmitting to the at least one entity associated with the vehicle the at least one alert in accordance with step 220 is described with respect to FIG. 6.

Figure 3:
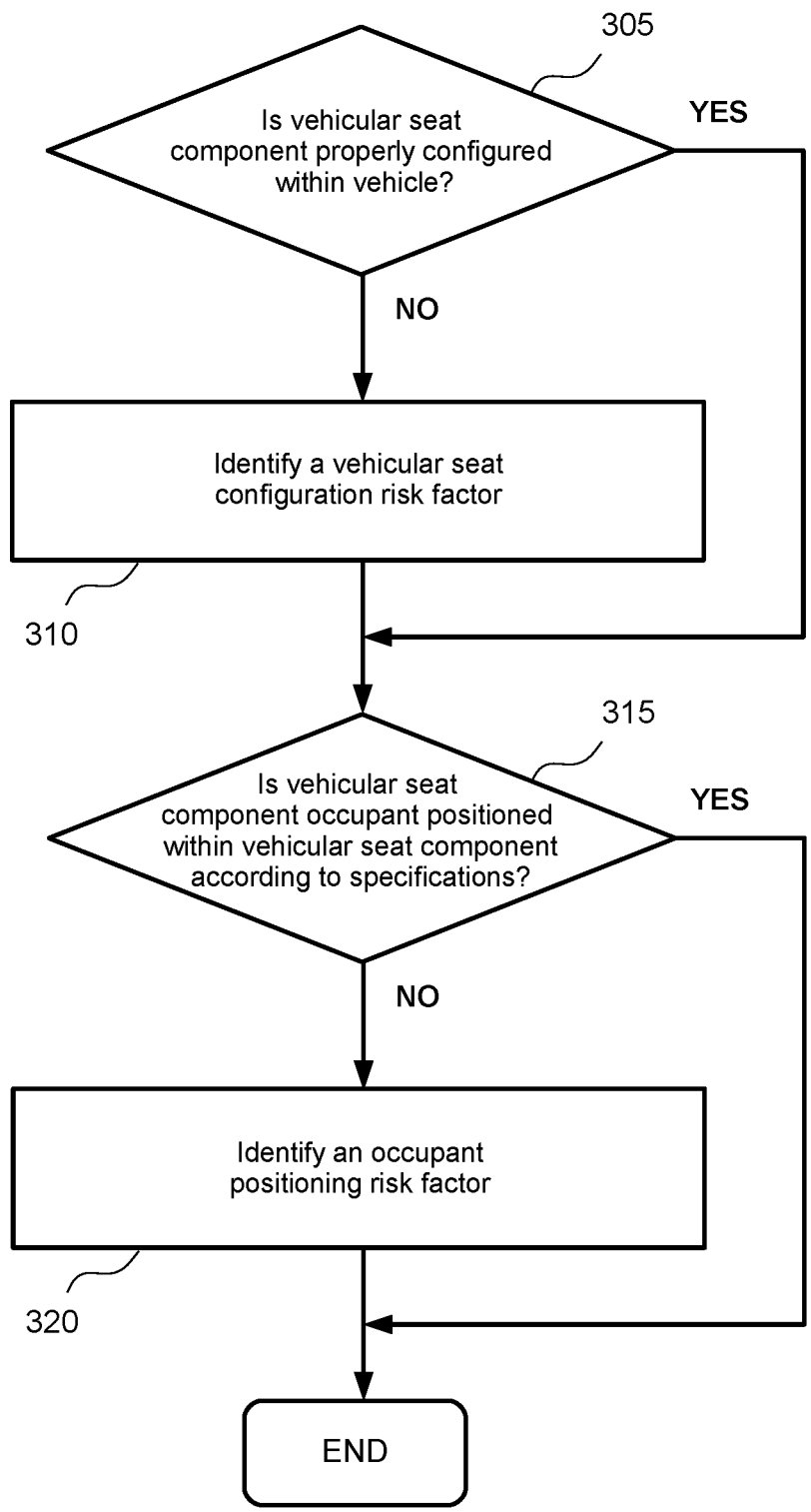
FIG. 3 illustrates a method of identifying any risk factor associated with a physical configuration of a vehicular seat component, according to one or more embodiments.

FIG. 3 illustrates a method 300 of identifying any risk factor associated with the physical configuration of the vehicular seat component. The method 300 provides one or more example embodiments with respect to step 205 of the method 200. The method 300 begins at step 305, where the server application determines whether the vehicular seat component is properly configured within the vehicle. According to step 305, the server application determines whether the vehicular seat component is properly configured within the vehicle by determining whether the vehicular seat component is properly affixed/attached to the vehicle and/or properly installed within the vehicle. In an embodiment, the server application determines whether the vehicular seat component is properly configured within the vehicle via data from the plurality of seat sensors. According to such embodiment, one or more of the plurality of seat sensors are embedded in or otherwise affixed to the vehicular seat component at expected contact points between the vehicular seat component and the vehicle. The server application optionally ensures that the vehicular seat component is properly configured within the vehicle based upon data received from the one or more seat sensors located at or otherwise associated with the expected contact points. Specifically, the server application optionally detects improper vehicular seat component configuration if one or more seat sensors located at the expected contact points return data or a notification indicating no contact or incomplete contact between the vehicular seat component and the vehicle. In a further embodiment, the server application determines whether the vehicular seat component is properly configured within the vehicle based upon one or more images or a video feed obtained via the one or more monitoring devices.

Based upon data obtained in accordance with the aforementioned embodiments, the server application optionally applies cognitive analysis to determine vehicular seat component configuration, e.g., through application one or more machine learning algorithms that accept as input seat sensor data and/or image processing data. More specifically, the server application trains a machine learning knowledge model by recording a plurality of vehicle datapoints and a plurality of seat component datapoints. Specifically, the server application optionally trains the model by recording vehicle datapoints pertaining to aspects of a portion of the vehicle in which the vehicular seat component is to be configured. The vehicle datapoints include dimensions of the portion of the vehicle and/or other characteristics with respect to layout of the vehicle. Furthermore, the server application optionally trains the model by recording seat component datapoints pertaining to aspects of the vehicular seat component, e.g., prior to configuration within the vehicle. The seat component datapoints include dimensions (e.g., seat length, width, depth) and/or other characteristics with respect to physical structure of the vehicular seat component (e.g., seat strap position and tension). The server application stores the vehicle datapoints and the seat component datapoints among knowledge base data (e.g., knowledge base data 157) associated with a representation of the machine learning knowledge model (e.g., machine learning knowledge model representation 151). Upon application of one or more machine learning algorithms via the machine learning knowledge model, the server application analyzes data received from the plurality of seat sensors and/or data received from the one or more monitoring devices in view of the vehicle datapoints and the seat component datapoints in order to quantitatively determine the configuration of the vehicular seat component within the vehicle. The server application optionally derives an expected position of the vehicular seat component within the vehicle based upon the vehicle datapoints and the seat component datapoints, in which case the quantitative determination optionally includes a percentage value indicating a percentage deviation of a position of the vehicular seat component from the expected position. Based upon the quantitative determination of the configuration of the vehicular seat component within the vehicle, the server application determines whether the vehicular seat component is properly configured within the vehicle. Furthermore, based upon the quantitative determination, the server application optionally updates the vehicle datapoints and/or the seat component datapoints to reflect any newly collected configuration data of potential relevance for future applications of the machine learning knowledge model.

Responsive to determining that the vehicular seat component is properly configured within the vehicle, the server application proceeds directly to step 315. Conversely, responsive to determining that the vehicular seat component is not properly configured within the vehicle (i.e., improperly configured within the vehicle), at step 310 the server application identifies a vehicular seat configuration risk factor. In an embodiment, in the event that the vehicle is partially or fully autonomous, the server application optionally sends a control signal disabling vehicle startup or operation responsive to determining that the vehicular seat component is not properly configured within the vehicle. In a further embodiment, the server application assigns a risk degree value to a vehicular seat configuration risk factor on a predefined risk degree scale based upon relative amount of misconfiguration of the vehicular seat component. The server application optionally determines parameters of the predefined risk degree scale, e.g., the server application designates an integer scale of 1 to 10, with 1 indicating minimal risk and 10 indicating highest risk. For instance, the server application may assign a relatively higher risk degree value on the predefined risk degree scale responsive to determining that the vehicular seat component is significantly mispositioned within the vehicle, while the server application may assign a relatively lower risk degree value on the predefined risk degree scale responsive to determining that the vehicular seat component is only slightly mispositioned within the vehicle. For instance, the server application may assign a higher risk degree value to a vehicular seat configuration risk factor pertaining to a position of the vehicular seat component being 25% from an expected position within the vehicle versus a vehicular seat configuration risk factor pertaining to a position of the vehicular seat component being 10% from the expected position.

At step 315, the server application determines whether the occupant of the vehicular seat component is positioned within the vehicular seat component according to specifications of the vehicular seat component. The server application determines whether the occupant is properly positioned in terms of whether one or more straps associated with the vehicular seat component are properly connected and/or whether tension of the one or more straps with respect to the occupant are within a predefined strap tension threshold designated for occupant safety and comfort. The server application optionally designates the predefined strap tension threshold based on size of the occupant in view of the specifications of the vehicular seat component. To determine proper seat strap connection and/or tension, the server application receives data from the plurality of seat sensors positioned on or adjacent to the one or more straps and/or receives data from the one or more monitoring devices. Additionally or alternatively, the server application determines whether the occupant is properly positioned in terms of placement within confines of the vehicular seat component. In an embodiment, the server application determines whether the occupant is properly situated within the vehicular seat component based upon data from the plurality of seat sensors. Specifically, one or more of the plurality of seat sensors are embedded in the vehicular seat component at pressure points of contact between the vehicular seat component and the occupant or otherwise are associated with the vehicular seat component. Based upon data from one or more the plurality of seat sensors embedded in the vehicular seat component, the server application optionally determines whether equal pressure is applied by the occupant at each of the pressure points of contact or alternatively determines whether equal pressure is applied by the occupant at a subset of the pressure points of contact. In a further embodiment, the server application determines whether the occupant is properly situated within the vehicular seat component based upon one or more images or a video feed received from the one or more monitoring devices.

Based upon data obtained in accordance with the aforementioned embodiments, particularly in terms of occupant placement within the confines of the vehicular seat component, the server application optionally applies cognitive analysis to determine occupant positioning, e.g., through application one or more machine learning algorithms that accept as input seat sensor data and/or image processing data. More specifically, the server application trains the machine learning knowledge model by recording a plurality of seat component datapoints. The server application optionally trains the model by facilitating measurement of aspects of the vehicular seat component, e.g., upon configuration within the vehicle. As previously described, the seat component datapoints include dimensions (e.g., seat length, width, depth) and/or other characteristics with respect to the physical structure of the vehicular seat component (e.g., seat strap position and tension). The server application stores the seat component datapoints among the knowledge base data associated with the representation of the machine learning knowledge model. Upon application of one or more machine learning algorithms via the machine learning knowledge model, the server application analyzes data received from the plurality of seat sensors and/or data received from the one or more monitoring devices in view of the seat component datapoints in order to quantitatively determine the relative position of the occupant with respect to the vehicular seat component. The server application optionally derives an expected position of the occupant within the confines of the vehicular seat component based upon the seat component datapoints, in which case the quantitative determination optionally includes a percentage value indicating a percentage deviation of a position of the occupant from the expected position. Based upon the quantitative determination of the position of the occupant with respect to the vehicular seat component, the server application determines whether the occupant is properly positioned within the confines of the vehicular seat component. Furthermore, based upon the quantitative determination, the server application optionally updates the seat component datapoints to reflect any newly collected positioning data of potential relevance for future applications of the machine learning knowledge model.

Responsive to determining that the occupant of the vehicular seat component is positioned within the vehicular seat component according to the specifications of the vehicular seat component, the server application proceeds directly to the end of the method 300. Conversely, responsive to determining that the occupant is not positioned within the vehicular seat component according to the specifications of the vehicular seat component (i.e., improperly positioned per the specifications of the vehicular seat component), at step 320 the server application identifies an occupant positioning risk factor. In an embodiment, the server application assigns a risk degree value to an occupant positioning risk factor on the predefined risk degree scale based upon relative amount of mispositioning of the occupant within the vehicular seat component. The server application may assign a relatively higher risk degree value on the predefined risk degree scale responsive to determining that the occupant is significantly mispositioned within the vehicular seat component, while the server application may assign a relatively lower risk degree value on the predefined risk scale responsive to determining that the occupant is only slightly mispositioned within the vehicular seat component. For instance, the server application may assign a lower risk degree value to an occupant positioning risk factor pertaining to a buckle of a seat strap one quarter inch from an expected position versus an occupant positioning risk factor pertaining to a buckle of a seat strap five inches from the expected position. In another instance, the server application may assign a higher risk degree value to an occupant positioning risk factor pertaining to a position of the occupant being 20% from an expected position within the confines of the vehicular seat component versus an occupant positioning risk factor pertaining to a position of the occupant being 5% from the expected position.

The server application optionally executes steps of the method 300 in a different order than presented above. For instance, the server application optionally executes steps 315 and 320 prior to executing steps 305 and 310. Alternatively, the server application optionally executes steps 305 and 310 without executing steps 315 and 320. Alternatively, the server application optionally executes steps 315 and 320 without executing steps 305 and 310.

Figure 4:
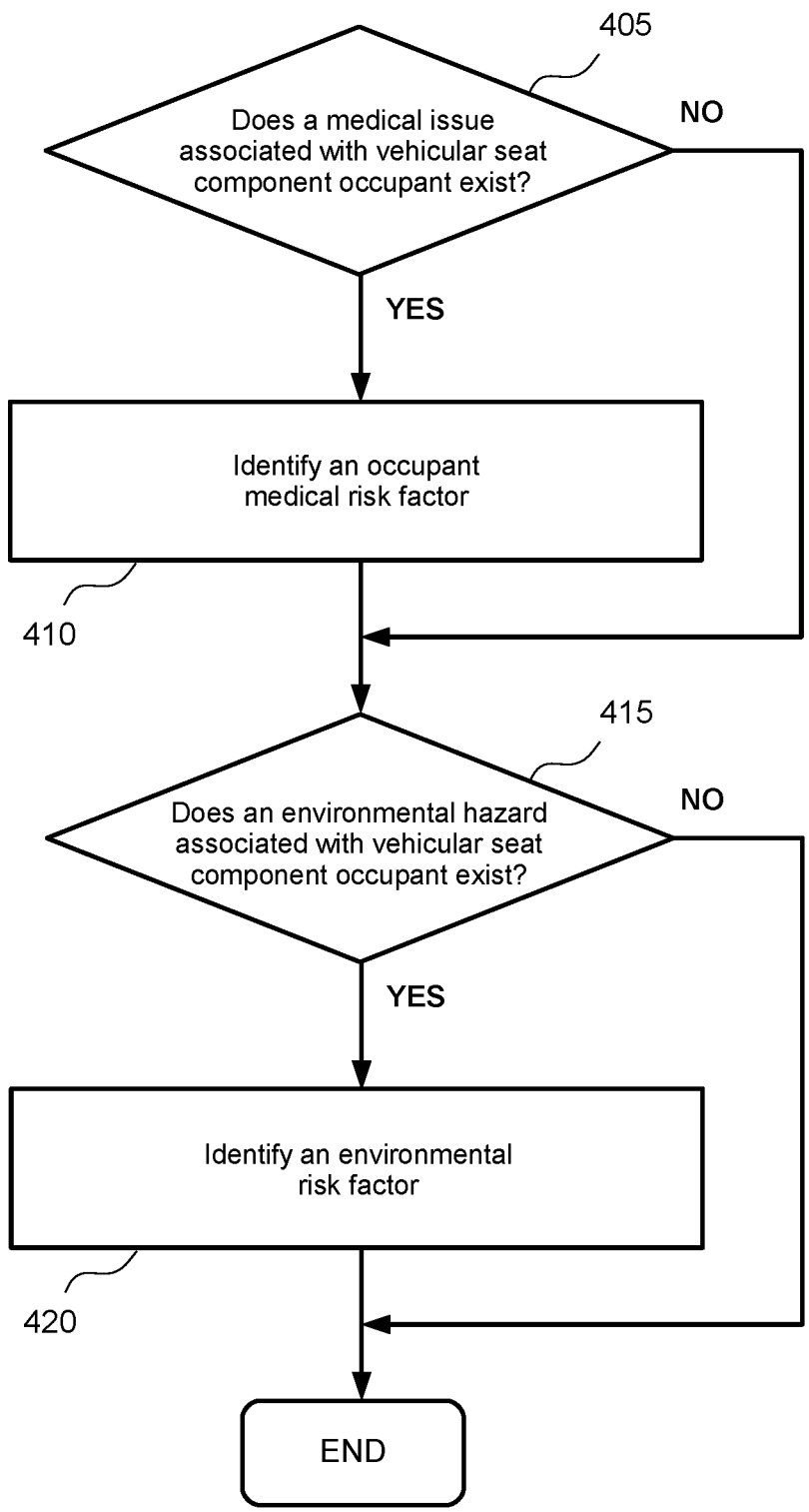
FIG. 4 illustrates a method of identifying any risk factor associated with health of an occupant of a vehicular seat component, according to one or more embodiments.

FIG. 4 illustrates a method 400 of identifying any risk factor associated with the health of the occupant of the vehicular seat component. The method 400 provides one or more example embodiments with respect to step 210 of the method 200. The method 400 begins at step 405, where the server application determines whether a medical issue associated with the occupant of the vehicular seat component exists. In an embodiment, the server application analyzes vital signs of the occupant upon receipt of data from the plurality of biometric sensors to identify a vital sign risk factor with respect to the occupant. One or more of the plurality of biometric sensors may be incorporated into or otherwise affixed to clothing of the occupant, may be incorporated into an object worn by or attached to the occupant (e.g., watch, bracelet, headgear), and/or may be injected or otherwise embedded in the occupant (e.g., under the skin). Vital signs measured by one or more of the plurality of biometric sensors optionally include body temperature, blood pressure, pulse/heart rate, and breathing rate/respiratory rate. For instance, the server application may receive information from one or more of the plurality of biometric sensors (specifically, respiratory sensors) indicating that breathing of the occupant has substantially slowed or ceased. Additionally or alternatively, the server application analyzes one or more images, a video feed, an audio feed, and/or an audiovisual feed captured from the one or more monitoring devices to identify at least one overt medical risk factor, such as bleeding, heavy breathing, choking, seizure, emotional distress, etc. For instance, an audio monitoring device may detect labored breathing sounds emitted from the occupant, and/or a video monitoring device may capture images of the occupant depicting significant respiratory distress.

Based upon data obtained in accordance with the aforementioned embodiments, the server application optionally applies cognitive analysis to determine the nature and severity of a medical issue, e.g., through application one or more machine learning algorithms that accept as input biometric sensor data and/or image/audio/audiovisual processing data. More specifically, the server application trains the machine learning knowledge model by recording a plurality of medical datapoints. The server application optionally trains the model by obtaining medical datapoints with respect to individuals similar to the occupant of the vehicular seat component, e.g., individuals of the same gender, within the same age group, having the same or similar preexisting medical condition(s), etc. The server application collects such medical datapoints in order to establish expected data ranges with respect to individual vital signs and/or behaviors. The server application stores the medical datapoints among the knowledge base data associated with the representation of the machine learning knowledge model. Upon application of one or more machine learning algorithms via the machine learning knowledge model, the server application analyzes data received from the plurality of biometric sensors and/or data received from the one or more monitoring devices in view of the medical datapoints in order to quantitatively determine whether the occupant of the vehicular seat component falls within expected data ranges with respect to individual vital signs and/or behaviors. Based upon the quantitative determination, the server application determines whether any medical issue with respect to the occupant exists. Specifically, the server application optionally identifies a medical issue affecting the occupant responsive to determining that biometric sensor data relevant to such medical issue falls outside one or more expected data ranges with respect to vital signs. Additionally or alternatively, the server application optionally identifies a medical issue responsive to determining that information derived from image/audio/audiovisual processing data obtained from the occupant falls outside one or more expected data ranges with respect to behavior. Furthermore, based upon the quantitative determination, the server application optionally updates the medical datapoints to reflect any newly collected medical data of potential relevance for future applications of the machine learning knowledge model.

Responsive to determining that no medical issue associated with the occupant of the vehicular seat component exists, the server application proceeds directly to step 415. Conversely, responsive to identifying (i.e., determining existence of) a medical issue associated with the occupant, at step 410 the server application identifies an occupant medical risk factor. In an embodiment, the server application assigns a risk degree value to an occupant medical risk factor on the predefined risk degree scale based upon relative seriousness of the medical risk and/or the degree of divergence of the medical risk from expected health conditions as determined via biometric sensor data. For instance, the server application may assign a relatively higher risk degree value on the predefined risk degree scale responsive to determining based upon biometric sensor data that the medical risk is potentially life threatening and/or reflects one or more factors that significantly diverge from expected health conditions, while the server application may assign a relatively lower risk degree value on the predefined risk degree scale responsive to determining that the medical risk poses little or no threat to life or safety and/or reflects little to no divergence from expected health conditions.

At step 415, the server application determines whether an environmental hazard associated with the occupant of the vehicular seat component exists. In an embodiment, an environmental hazard involves an external object. According to such embodiment, the server application analyzes one or more images, a video feed, and/or an audiovisual feed from the one or more monitoring devices to determine insertion (or high probability of imminent insertion) of one or more objects into the mouth, nose, ear, or eyes of the occupant by the occupant or by a third party engaged with the occupant, e.g., a young child seated next to the occupant. Additionally or alternatively, the server application analyzes an audio feed from the one or more monitoring devices to detect insertion (or high probability of imminent insertion) of one or more objects into the mouth, nose, ear, or eyes of the occupant, e.g., via sounds indicating choking, etc. In a further embodiment, an environmental hazard involves activity on the part of the occupant. According to such further embodiment, the server application analyzes one or more images, a video feed, an audio feed, and/or an audiovisual feed from the one or more monitoring devices to determine one or more potentially hazardous activities by the occupant (e.g., tampering with one or more straps of the vehicular seat component by the occupant). In a further embodiment, an environmental hazard involves activity on the part of a third party engaged with the occupant. For instance, according to such further embodiment, the server application analyzes one or more images, a video feed, an audio feed, and/or an audiovisual feed from the one or more monitoring devices to determine one or more potentially hazardous activities by a third party engaged with the occupant (e.g., belligerent activity toward the occupant on the part of a young child seated next to the occupant).

Based upon data obtained in accordance with the aforementioned embodiments, the server application optionally applies cognitive analysis to identify one or more environmental hazards, e.g., through application one or more machine learning algorithms that accept as input image processing data and/or audio processing data. The server application optionally trains the machine learning knowledge model by recording a plurality of seat component datapoints and a plurality of vehicle environment datapoints. As previously discussed, the seat component datapoints include dimensions (e.g., seat length, width, depth) and/or other characteristics with respect to the physical structure of the vehicular seat component. The vehicle environment datapoints include data with respect to physical characteristics of the occupant of the vehicular seat component, physical characteristics with respect to any third party in the vehicle, and/or characteristics with respect to any object within a designated proximity of the vehicular seat component. The server application stores the seat component datapoints and the environmental datapoints among the knowledge base data associated with the representation of the machine learning knowledge model. Upon application of one or more machine learning algorithms via the machine learning knowledge model, the server application analyzes data received from the one or more monitoring devices in view of the seat component datapoints and the environmental datapoints in order to determine the presence of any potential environmental hazard, e.g., by determining the presence of any external object or third party within the confines of or immediately adjacent to the vehicular seat component. Furthermore, the server application optionally updates the seat component datapoints and/or the vehicle environment datapoints to reflect any newly collected position data and/or vehicle environment data of potential relevance for future applications of the machine learning knowledge model.

Responsive to determining that no environmental hazard associated with the occupant of the vehicular seat component exists, the server application proceeds directly to the end of the method 400. Conversely, responsive to identifying (i.e., determining existence of) an environmental hazard associated with the occupant, at step 420 the server application identifies an environmental risk factor. In an embodiment, the server application assigns a risk degree value to an environmental risk factor on the predefined risk degree scale based upon relative seriousness of the environmental hazard. For instance, the server application may assign a relatively higher risk degree value on the predefined risk degree scale responsive to determining that the environmental hazard is potentially life threatening, while the server application may assign a relatively lower risk degree value on the predefined risk degree scale responsive to determining that the environmental hazard poses little or no threat to life or safety.

The server application optionally executes steps of the method 400 in a different order than presented above. For instance, the server application optionally executes steps 415 and 420 prior to executing steps 405 and 410. Alternatively, the server application optionally executes steps 405 and 410 without executing steps 415 and 420. Alternatively, the server application optionally executes steps 415 and 420 without executing steps 405 and 410.

Figure 5:
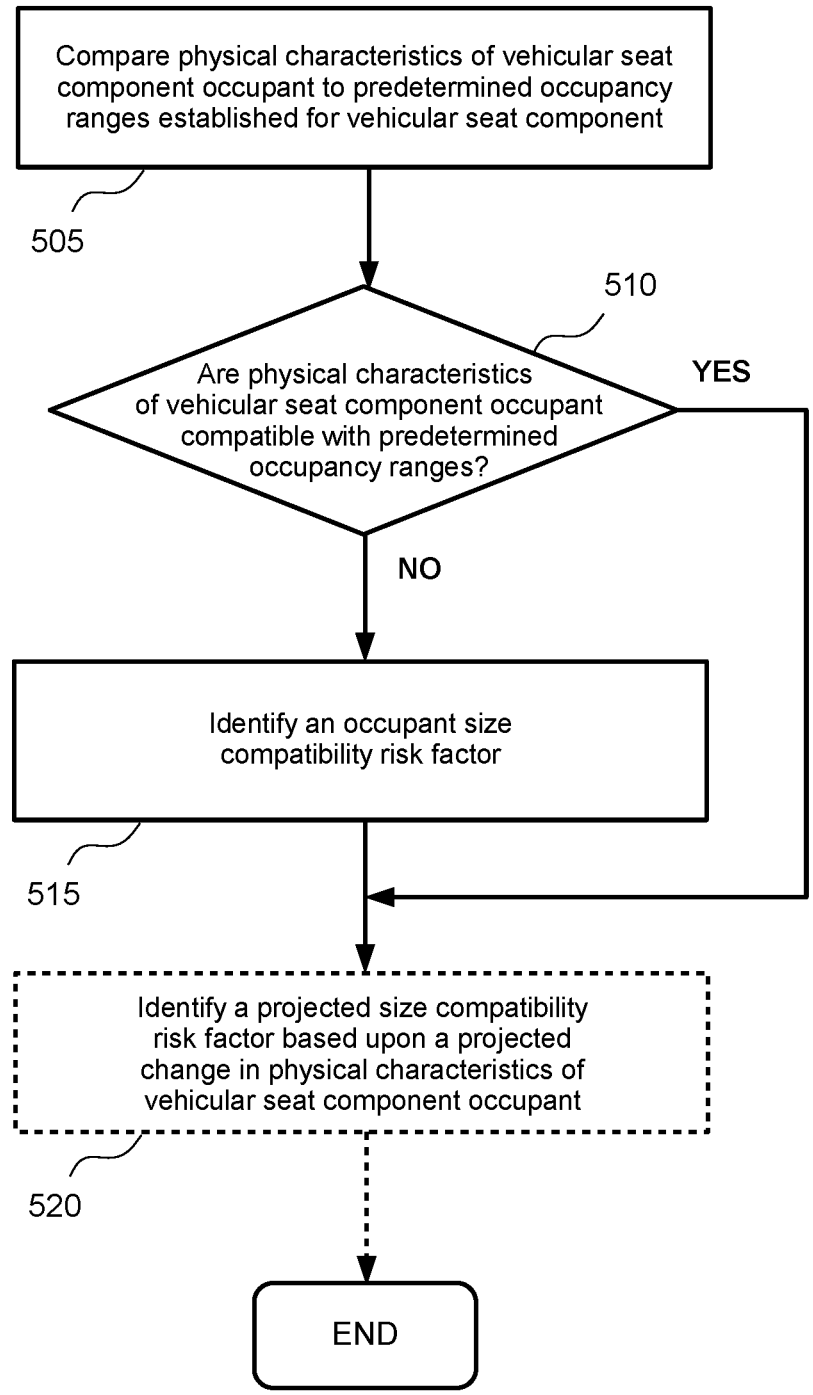
FIG. 5 illustrates a method of identifying any risk factor associated with compatibility of an occupant of a vehicular seat component, according to one or more embodiments.

FIG. 5 illustrates a method 500 of identifying any risk factor associated with the compatibility of the occupant of the vehicular seat component. The method 500 provides one or more example embodiments with respect to step 215 of the method 200. The method 500 begins at step 505, where the server application compares physical characteristics of the occupant of the vehicular seat component to predetermined occupancy ranges established for the vehicular seat component. The server application optionally identifies the physical characteristics (height/weight) of the occupant based upon the plurality of seat sensors. e.g., from analysis of pressure points of the occupant with respect to the vehicular seat component. Additionally or alternatively, the server application optionally identifies the physical characteristics of the occupant based upon one or more images, a video feed, and/or an audiovisual feed received from the one or more monitoring devices. Additionally or alternatively, the server application optionally identifies the physical characteristics of the occupant by requesting and receiving information from the at least one entity associated with the vehicle and/or publicly available data sources (e.g., agency databases, etc.). The predetermined occupancy ranges define length/height and weight ranges with respect to the vehicular seat component, as determined by the vehicular seat component manufacturer and/or by law.

At step 510, consequent to the comparison, the server application determines whether the physical characteristics of the occupant of the vehicular seat component are compatible with the predetermined occupancy ranges. According to step 510, the server application determines whether the physical characteristics of the occupant are compatible with the predetermined occupancy ranges by determining whether each of the physical characteristics currently fall within the predetermined occupancy ranges. Responsive to determining that the physical characteristics of the occupant are compatible with the predetermined occupancy ranges, i.e., responsive to determining that each of the physical characteristics currently fall within the predetermined occupancy ranges, the server application proceeds directly to step 520. Conversely, responsive to determining that the physical characteristics of the occupant are incompatible with the predetermined occupancy ranges, i.e., responsive to determining that one or more of the physical characteristics currently fall outside of the predetermined occupancy ranges by exceeding upper limit(s) or falling below lower limit(s), at step 515 the server application identifies an occupant size compatibility risk factor. In an embodiment, the server application assigns a risk degree value to an occupant size compatibility risk factor on the predefined risk degree scale based upon relative magnitude of occupant size incompatibility. For instance, the server application may assign a relatively higher risk degree value on the predefined risk degree scale responsive to determining that one or more of the physical characteristics of the occupant currently fall significantly beyond the predetermined occupancy ranges, while the server application may assign a relatively lower risk degree value on the predefined risk degree scale responsive to determining that any affected physical characteristics of the occupant currently fall only slightly beyond the predetermined occupancy ranges.

Optionally, at step 520, consequent to the comparison, the server application identifies a projected size compatibility risk factor based upon a projected change in the physical characteristics of the occupant of the vehicular seat component. In an embodiment, the server application assigns a risk degree value to a projected size compatibility risk factor on the predefined risk degree scale based upon relative magnitude of the projected size incompatibility. For instance, the server application may assign a relatively higher risk degree value on the predefined risk degree scale responsive to determining that the projected change in the physical characteristics of the occupant will require relatively more urgent replacement of the vehicular seat component, while the server application may assign a relatively lower risk degree value on the predefined risk degree scale responsive to determining that the projected change in the physical characteristics of the occupant will require relatively less urgent replacement of the vehicular seat component.

In an embodiment, in the event that the occupant is a child, based upon the projected growth of the child as determined by historic rate of growth of the child compared to averages of children of the same gender and age group obtained from one or more data sources (e.g., publicly available databases), according to step 520 the server application applies predictive analytics to project a date that one or more of the physical characteristics of the occupant depart from the predetermined occupancy ranges established for the vehicular seat component, by exceeding one or more upper limits thereof. According to such embodiment, the server application determines an estimated remaining useful life of the vehicular seat component for use by the child based upon seat limitations, current size of the child, and historic growth rate of the child compared to average growth rate. For instance, assuming that the occupant of the vehicular seat component is a toddler, the server application may identify the height and weight of the toddler based upon the plurality of seat sensors and further may determine based upon a historical growth curve for the toddler as compared to national averages of toddlers of the same gender and age group obtained from a public database that the toddler is within four pounds of outgrowing the vehicular seat component. Based upon the projected change in size of the toddler, the server application may recommend that a new, larger vehicular seat component be selected within three months.

Alternatively, in the event that the occupant is an elderly or infirm individual, based upon projected growth (e.g., weight gain) or projected atrophy (e.g., muscle atrophy) of the elderly individual as determined by historic rate of growth or historic rate of atrophy of the elderly individual compared to averages of similar elderly individuals (e.g., of the same gender, of the same age group, and/or having the same preexisting condition) obtained from one or more data sources, according to step 520 the server application applies predictive analysis to project a date that one or more of the physical characteristics of the occupant depart from the predetermined occupancy ranges established for the vehicular seat component, either by exceeding one or more upper limits or by falling below one or more lower limits. For instance, assuming that the occupant of the vehicular seat component is an individual with muscular dystrophy, the server application may identify the height and weight of the individual based upon the plurality of seat sensors and further may determine based upon historical data related to rate of muscle loss in the individual compared to national averages for muscular dystrophy patients of the same gender and age group that the individual is within 10 pounds of falling below the lower weight limit for the vehicular seat component. Based upon the projected change in size of the individual, the server application may recommend that a new, smaller vehicular seat component be selected within six months.

The server application optionally executes steps of the method 500 in a different order than presented above. For instance, the server application optionally executes step 520 prior to executing steps 510 and 515. Alternatively, the server application optionally executes steps 510 and 510 without executing step 520. Alternatively, the server application optionally executes step 520 without executing steps 510 and 515.

Figure 6:
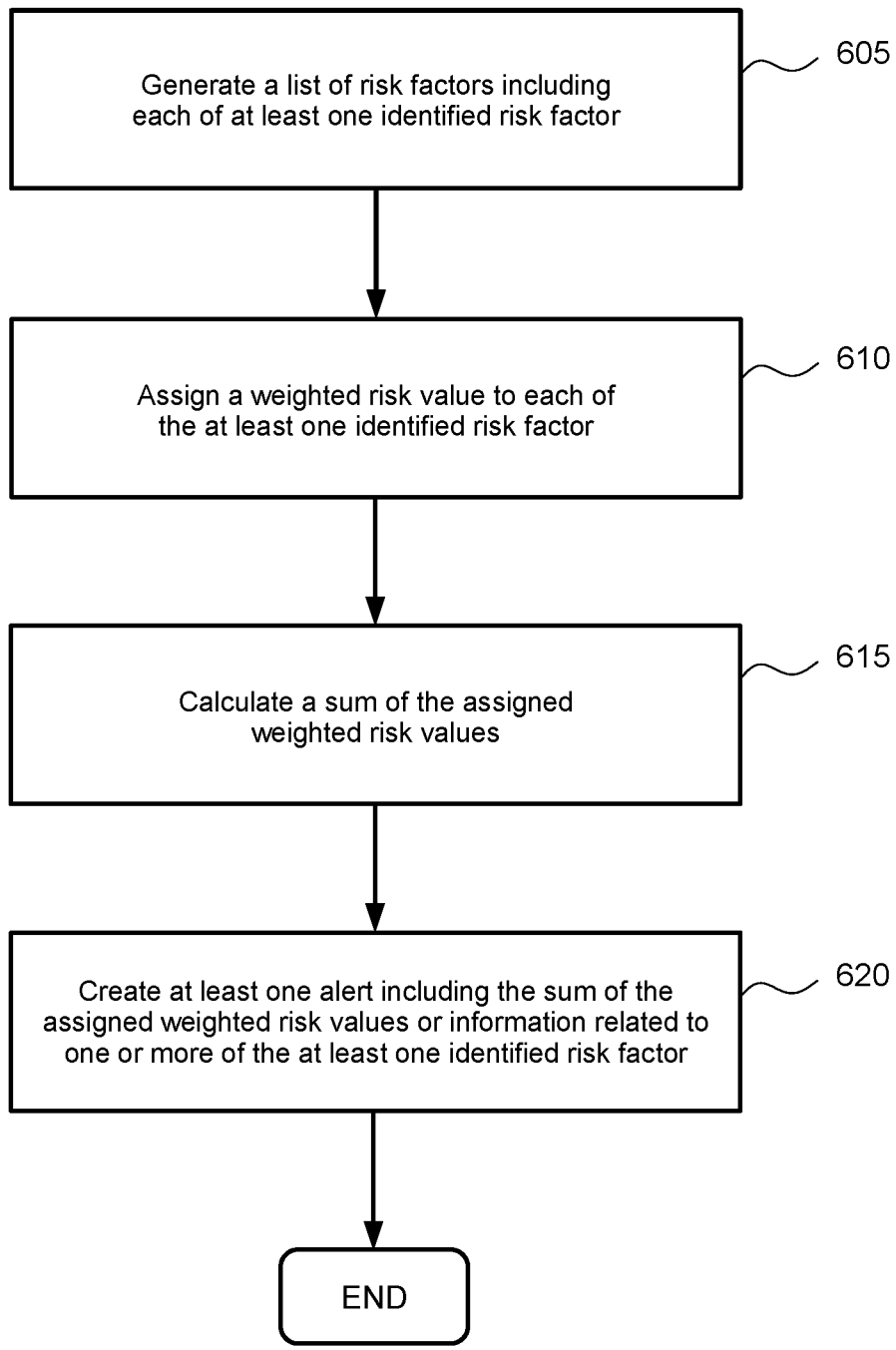
FIG. 6 illustrates a method of transmitting at least one alert to at least one entity associated with a vehicle, according to one or more embodiments.

FIG. 6 illustrates a method 600 of transmitting to the at least one entity associated with the vehicle the at least one alert addressing at least one identified risk factor. The method 600 provides one or more example embodiments with respect to step 220 of the method 200. The method 600 begins at step 605, where the server application generates a list of risk factors including each of the at least one identified risk factor. At step 610, the server application assigns a weighted risk value to each of the at least one identified risk factor. The weighted risk value assigned to each identified risk factor indicates overall degree of risk with respect to the vehicular seat component relative to all other identified risk factors among all risk factor categories. In an embodiment, the server application stores metadata with respect to the list of risk factors and respective assigned weighted risk value(s) in one or more databases. According to such embodiment, the metadata optionally includes information derived from the plurality of seat sensors and/or the plurality of biometric sensors, e.g., a percentage/degree that any sensor data values deviate from any expected data ranges.

In a further embodiment, the server application designates a weighted risk value for each identified risk factor based upon a predefined weighted risk scale, e.g., an integer scale of 1 to 10, with 1 indicating minimal weighted risk and 10 indicating highest weighted risk. According to such further embodiment, the predefined weighted risk scale optionally is identical to or otherwise correlated with the predefined risk degree scale. The server application optionally determines parameters of the predefined weighted risk scale. Additionally, according to such further embodiment, the weighted risk value assigned by the server application for each identified risk factor optionally fully correlates or partially correlates with any assigned risk degree value as previously discussed with respect to the methods 300-500. Specifically, in the event that the weighted risk value for each identified risk factor fully correlates with any assigned risk degree value, the weighted risk value is equal to or is directly proportional to any such assigned risk degree value. Alternatively, in the event that the weighted risk value for each identified risk factor partially correlates with any assigned risk degree value, the server application optionally weights identified risk factors differently based upon risk factor category. According to such alternative, the server application may weight a risk factor differently based upon whether such risk factor is associated with the configuration of the vehicular seat component, the health of the occupant of the vehicular seat component, or the compatibility of the occupant of the vehicular seat component. Based upon such partial correlation alternative, the server application optionally prioritizes identified risk factor(s) associated with a given risk factor category over identified risk factor(s) associated with another risk factor category. Accordingly, the server application optionally applies a policy to prioritize risk factor categories. More specifically, according to such alternative, the server application may assign a relatively higher weighted risk value to a given identified risk factor associated with a certain risk factor category having a certain assigned risk degree value and may assign a relatively lower weighted risk value to another given identified risk factor associated with another risk factor category having the same certain assigned risk degree value. For instance, assuming that a server application policy prioritizes identified risk factors associated with the health of the occupant of the vehicular seat component over identified risk factors associated with the compatibility of the occupant of the vehicular seat component, and assuming that the server application assigns a risk degree value of 5 to both an occupant health risk factor and an occupant compatibility risk factor, the server application may assign a weighted risk value of 7 to the occupant health risk factor but a weighted risk value of 5 to the occupant compatibility risk factor.

At step 615, the server application calculates a sum of the assigned weighted risk values. In an embodiment, the server application calculates a sum of all weighted risk values, i.e., taking into account weighted risk values of all risk factor categories. Additionally or alternatively, the server application calculates one or more respective weighted risk value sums for one or more risk factor categories, i.e., a sum of weighted risk values assigned to risk factor(s) associated with the physical configuration of the vehicular seat component, a sum of weighted risk values assigned to risk factor(s) associated with the health of the occupant of the vehicular seat component, and a sum of weighted risk values assigned to risk factor(s) associated with the compatibility of the occupant of the vehicular seat component.

At step 620, the server application creates the at least one alert, e.g., for purposes of relaying the at least one alert. Optionally, the at least one alert created at step 620 includes the sum of the assigned weighted risk values. In an embodiment, the server application includes the sum of all weighted risk values. Additionally or alternatively, the server application includes one or more respective weighted risk value sums for one or more risk factor categories. According to such embodiments, the server application includes in the at least one alert the sum value and/or datapoints enabling a contextual depiction of the sum value as a graphical illustration in at least one client interface. For instance, such datapoints may enable a relatively higher sum value to be displayed in red, may enable a relatively moderate sum value to be displayed in yellow, and/or may enable a relatively lower sum value to be displayed in green in the at least one client interface.

Additionally or alternatively, the at least one alert created at step 620 includes information related to one or more of the at least one identified risk factor based upon weighted risk value in the context of at least one predefined risk threshold value. The server application determines information to be included in the at least one alert based upon whether weighted risk value(s) of identified risk factor(s) overall or whether weighted risk value(s) of identified risk factor(s) associated with one or more risk factor categories exceed one or more of the at least one predefined risk threshold value. The at least one predefined risk threshold value optionally is determined by the at least one entity associated with the vehicle or alternatively is determined by the server application. In the context of step 620, information related to one or more of the at least one identified risk factor optionally includes details of any such identified risk factor, such as any aspect of the vehicular seat component and/or the occupant affected by any such identified risk factor and/or level of urgency, e.g., the weighted risk value of any such identified risk factor and/or datapoints enabling a contextual depiction of the weighted risk value as a graphical illustration in at least one client interface. For instance, such datapoints may enable a relatively higher weighed risk value to be displayed in red, may enable a relatively moderate weighed risk value to be displayed in yellow, and/or may enable a relatively lower weighed risk value to be displayed in green in the at least one client interface. Additionally, information related to one or more of the at least one identified risk factor optionally includes one or more recommended actions to address any such identified risk factor.

In an embodiment, the server application applies multiple predefined risk threshold values, e.g., two predefined risk threshold values including a lower predefined risk threshold value and a higher predefined risk threshold value, to determine alert activity. According to such embodiment, the server application classifies any identified risk factor having a weighted risk value at or below the lower predefined risk threshold value as a low level risk factor and refrains from sending an alert including information related to any such identified risk factor until the vehicle is not in use or not in motion. The server application optionally relays alert(s) for low level risk factors at predefined intervals of time and/or upon request of one or more of at least one entity associated with the vehicle (e.g., in accordance with any registration notification setting). According to such embodiment, the server application classifies any identified risk factor having a weighted risk value exceeding the lower predefined risk threshold but at or below the higher predefined risk threshold value as a moderate level risk factor and sends an alert of moderate importance including information related to any such identified risk factor. The server application optionally relays moderate level risk factors immediately but does not mandate immediate action for such risk factors. For instance, the server application may encourage the at least one entity associated with the vehicle to address the moderate level risk factor as soon as possible, e.g., upon arriving at a service station. According to such embodiment, the server application classifies any identified risk factor having a weighted risk value exceeding the higher predefined risk threshold value as a high level risk factor and sends an alert of urgency including information related to any such identified risk factor. The server application optionally issues an urgent alert and mandates immediate action on the part of the at least one entity associated with the vehicle. In the event that the vehicle is partially or fully autonomous, the server application optionally sends a control signal disabling one or more vehicle functions in conjunction with the urgent alert.

In an alternative embodiment, the server application applies a single predefined risk threshold value to determine alert activity. According to such alternative embodiment, the server application classifies any identified risk factor having a having a weighted risk value at or below the predefined risk threshold value as a low level risk factor and refrains from sending an immediate alert. Rather, the server application optionally refrains from sending an alert including information related to any low level risk factor until the vehicle is not in use or not in motion. The server application optionally relays alert(s) for low level risk factors at predefined intervals of time and/or upon request of one or more of at least one entity associated with the vehicle (e.g., in accordance with any registration notification setting). According to such alternative embodiment, the server application classifies any identified risk factor having a having a weighted risk value exceeding the predefined risk threshold value as a high level risk factor and sends an alert of urgency including information related to any such identified risk factor.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description and should cover all possibly equivalent variations and equivalent arrangements. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    identifying any risk factor associated with a physical configuration of a vehicular seat component within a vehicle;
    identifying any risk factor associated with health of an occupant of the vehicular seat component;
    identifying any risk factor associated with compatibility of the occupant of the vehicular seat component; and
    transmitting to at least one entity associated with the vehicle at least one alert addressing at least one identified risk factor, the transmitting comprising:
        assigning a weighted risk value to each of the at least one identified risk factor;
        calculating a sum of the assigned weighted risk values; and
        creating the at least one alert including the sum of the assigned weighted risk values or including information related to one or more of the at least one identified risk factor based upon weighted risk value in the context of at least one predefined risk threshold value.

2. The computer-implemented method of claim 1, wherein identifying any risk factor associated with the physical configuration of the vehicular seat component comprises:
    identifying a vehicular seat configuration risk factor by determining that the vehicular seat component is improperly configured within the vehicle.

3. The computer-implemented method of claim 1, wherein identifying any risk factor associated with the physical configuration of the vehicular seat component comprises:
    identifying an occupant positioning risk factor by determining that the occupant of the vehicular seat component is improperly positioned within the vehicular seat component per specifications of the vehicular seat component.

4. The computer-implemented method of claim 1, wherein identifying any risk factor associated with the health of the occupant of the vehicular seat component comprises:
    identifying an occupant medical risk factor by identifying a medical issue associated with the occupant of the vehicular seat component.

5. The computer-implemented method of claim 1, wherein identifying any risk factor associated with the health of the occupant of the vehicular seat component comprises:
    identifying an environmental risk factor by identifying an environmental hazard associated with the occupant of the vehicular seat component.

6. The computer-implemented method of claim 1, wherein identifying any risk factor associated with the compatibility of the occupant of the vehicular seat component comprises:
    comparing physical characteristics of the occupant of the vehicular seat component to predetermined occupancy ranges established for the vehicular seat component; and
    consequent to the comparison, identifying an occupant size compatibility risk factor by determining that the physical characteristics of the occupant of the vehicular seat component are incompatible with the predetermined occupancy ranges.

7. The computer-implemented method of claim 6, wherein identifying any risk factor associated with the compatibility of the occupant of the vehicular seat component further comprises:
    consequent to the comparison, identifying a projected size compatibility risk factor based upon a projected change in the physical characteristics of the occupant of the vehicular seat component.

8. The computer-implemented method of claim 1, wherein the transmitting further comprises:
    generating a list of risk factors including each of the at least one identified risk factor.

9. A computer program product comprising a computer readable storage medium having program instructions embodied therewith, the program instructions executable by a computing device to cause the computing device to:
    identify any risk factor associated with a physical configuration of a vehicular seat component within a vehicle;
    identify any risk factor associated with health of an occupant of the vehicular seat component;
    identify any risk factor associated with compatibility of the occupant of the vehicular seat component; and
    transmit to at least one entity associated with the vehicle at least one alert addressing at least one identified risk factor, the transmitting comprising:
        assigning a weighted risk value to each of the at least one identified risk factor;

calculating a sum of the assigned weighted risk values; and creating the at least one alert including the sum of the assigned weighted risk values or including information related to one or more of the at least one identified risk factor based upon weighted risk value in the context of at least one predefined risk threshold value.

10. The computer program product of claim 9, wherein identifying any risk factor associated with the physical configuration of the vehicular seat component comprises:

identifying a vehicular seat configuration risk factor by determining that the vehicular seat component is improperly configured within the vehicle.

11. The computer program product of claim 9, wherein identifying any risk factor associated with the physical configuration of the vehicular seat component comprises:

identifying an occupant positioning risk factor by determining that the occupant of the vehicular seat component is improperly positioned within the vehicular seat component per specifications of the vehicular seat component.

12. The computer program product of claim 9, wherein identifying any risk factor associated with the health of the occupant of the vehicular seat component comprises:

identifying an occupant medical risk factor by identifying a medical issue associated with the occupant of the vehicular seat component.

13. The computer program product of claim 9, wherein identifying any risk factor associated with the health of the occupant of the vehicular seat component comprises:

identifying an environmental risk factor by identifying an environmental hazard associated with the occupant of the vehicular seat component.

14. The computer program product of claim 9, wherein identifying any risk factor associated with the compatibility of the occupant of the vehicular seat component comprises:

comparing physical characteristics of the occupant of the vehicular seat component to predetermined occupancy ranges established for the vehicular seat component; and consequent to the comparison, identifying an occupant size compatibility risk factor by determining that the physical characteristics of the occupant of the vehicular seat component are incompatible with the predetermined occupancy ranges.

15. A system comprising:
a processor; and
a memory storing an application program, which, when executed on the processor, performs an operation comprising:
identifying any risk factor associated with a physical configuration of a vehicular seat component within a vehicle;
identifying any risk factor associated with health of an occupant of the vehicular seat component;
identifying any risk factor associated with compatibility of the occupant of the vehicular seat component; and transmitting to at least one entity associated with the vehicle at least one alert addressing at least one identified risk factor, the transmitting comprising:
assigning a weighted risk value to each of the at least one identified risk factor;
calculating a sum of the assigned weighted risk values; and
creating the at least one alert including the sum of the assigned weighted risk values or including information related to one or more of the at least one identified risk factor based upon weighted risk value in the context of at least one predefined risk threshold value.

16. The system of claim 15, wherein identifying any risk factor associated with the physical configuration of the vehicular seat component comprises:

identifying a vehicular seat configuration risk factor by determining that the vehicular seat component is improperly configured within the vehicle.

17. The system of claim 15, wherein identifying any risk factor associated with the physical configuration of the vehicular seat component comprises:

identifying an occupant positioning risk factor by determining that the occupant of the vehicular seat component is improperly positioned within the vehicular seat component per specifications of the vehicular seat component.

18. The system of claim 15, wherein identifying any risk factor associated with the health of the occupant of the vehicular seat component comprises:

identifying an occupant medical risk factor by identifying a medical issue associated with the occupant of the vehicular seat component.

19. The system of claim 15, wherein identifying any risk factor associated with the health of the occupant of the vehicular seat component comprises:

identifying an environmental risk factor by identifying an environmental hazard associated with the occupant of the vehicular seat component.

20. The system of claim 15, wherein identifying any risk factor associated with the compatibility of the occupant of the vehicular seat component comprises:

comparing physical characteristics of the occupant of the vehicular seat component to predetermined occupancy ranges established for the vehicular seat component; and consequent to the comparison, identifying an occupant size compatibility risk factor by determining that the physical characteristics of the occupant of the vehicular seat component are incompatible with the predetermined occupancy ranges.

* * * * *